(12) United States Patent
Kamiya et al.

(10) Patent No.: US 11,221,878 B2
(45) Date of Patent: Jan. 11, 2022

(54) TASK MANAGEMENT APPARATUS

(71) Applicant: DENSO CORPORATION, Kariya (JP)

(72) Inventors: Akio Kamiya, Kariya (JP); Tsuyoshi Kurebayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 183 days.

(21) Appl. No.: 16/750,362

(22) Filed: Jan. 23, 2020

(65) Prior Publication Data

US 2020/0264922 A1 Aug. 20, 2020

(30) Foreign Application Priority Data

Feb. 15, 2019 (JP) .............................. JP2019-025720

(51) Int. Cl.
*G06F 9/46* (2006.01)
*G06F 9/48* (2006.01)
*G06F 9/50* (2006.01)
*G06F 3/06* (2006.01)

(52) U.S. Cl.
CPC ............ *G06F 9/4881* (2013.01); *G06F 3/067* (2013.01); *G06F 9/5038* (2013.01)

(58) Field of Classification Search
CPC ....... G06F 9/4881; G06F 3/067; G06F 9/5038
See application file for complete search history.

(56) References Cited

U.S. PATENT DOCUMENTS

| 5,119,374 | A | * | 6/1992 | Firoozmand | .......... H04L 12/433 |
| | | | | | 370/455 |
| 5,465,335 | A | | 11/1995 | Anderson | |
| 2004/0163089 | A1 | | 8/2004 | Nishimura | |
| 2008/0037567 | A1 | * | 2/2008 | Cho | .................... H04L 47/2408 |
| | | | | | 370/401 |
| 2012/0324462 | A1 | * | 12/2012 | Miljanic | ............. G06F 15/7867 |
| | | | | | 718/103 |

FOREIGN PATENT DOCUMENTS

| JP | 2000-013762 A | 1/2000 |
| JP | 2000-137621 A | 5/2000 |
| JP | 2016-173750 A | 9/2016 |

* cited by examiner

*Primary Examiner* — Wissam Rashid
(74) *Attorney, Agent, or Firm* — Posz Law Group, PLC

(57) ABSTRACT

A task management apparatus is configured to execute a time synchronous task and a time asynchronous task, which are enqueued in a task registration storage, and to enqueue and accumulate the time asynchronous task in a task accumulation storage prior to enqueuing the time asynchronous task in the task registration storage. The task management apparatus is configured to dequeue the time asynchronous task from the task accumulation storage and enqueue the dequeued time asynchronous task in the task registration storage.

8 Claims, 11 Drawing Sheets

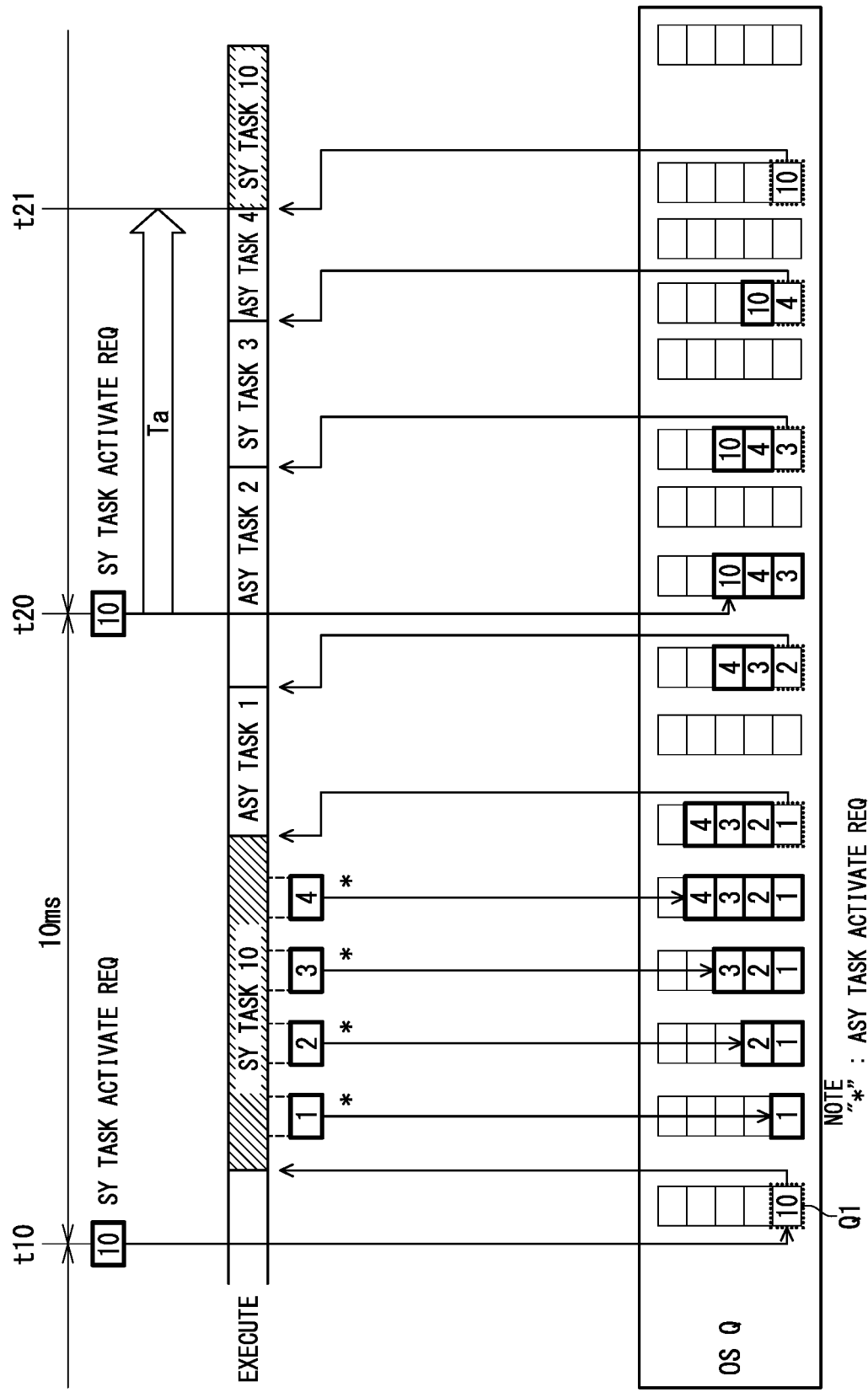

TASK MANAGEMENT APPARATUS

CROSS REFERENCE TO RELATED APPLICATION

The present application claims the benefit of priority from Japanese Patent Application No. 2019-25720 filed on Feb. 15, 2019. The entire disclosure of the above application is incorporated herein by reference.

TECHNICAL FIELD

The present disclosure relates to a task management apparatus that manages the execution order of time synchronous tasks and time asynchronous tasks.

BACKGROUND

There is a real-time operating system (hereinafter referred to as RTOS) that manages the execution order of tasks that occur sequentially. Tasks, which include a time synchronous task and a time asynchronous task, enqueued in the RTOS are executed in the order of enqueue. Note that a priority is preset for each task. If a high priority task is enqueued while a low priority task is being executed, the RTOS interrupts the low priority task being executed and executes the high priority task.

SUMMARY

According to a first example of the present disclosure, a task management apparatus is configured to execute a time synchronous task and a time asynchronous task, which are enqueued in a task registration storage. The task management apparatus is configured to enqueue and accumulate the time asynchronous task in a task accumulation storage prior to enqueuing the time asynchronous task in the task registration storage. The task management apparatus is configured to dequeue the time asynchronous task from the task accumulation storage and enqueue the dequeued time asynchronous task in the task registration storage.

According to a second example of the present disclosure, a task management apparatus is configured to execute a time synchronous task and a time asynchronous task, which are enqueued in a task registration storage. The task management apparatus is configured to enqueue and accumulate the time asynchronous task in a task accumulation storage. The task management apparatus is configured to generate an execution request task and enqueue the generated execution request task in the task registration storage in response to that (i) there is no task enqueued in the task registration storage and (ii) the time asynchronous task is accumulated in the task accumulation storage. The execution request task requests an execution of the time asynchronous task in the task accumulation storage.

BRIEF DESCRIPTION OF DRAWINGS

The objects, features and advantages of the present disclosure will become more apparent from the following detailed description made with reference to the accompanying drawings. In the drawings:

FIG. 15 is a time chart showing a process at the time of occurrence of a time asynchronous task by a task management apparatus as a comparative example of the first embodiment.

DETAILED DESCRIPTION

Hereinafter, several embodiments of the present disclosure will be described with reference to the drawings. Note that the same reference signs are assigned to the corresponding elements in each embodiment, and thus, duplicate descriptions may be omitted. When only a part of the configuration is described in each embodiment, the configuration of other preceding embodiments can be applied to other parts of the configuration.

First Embodiment

Figure 1:
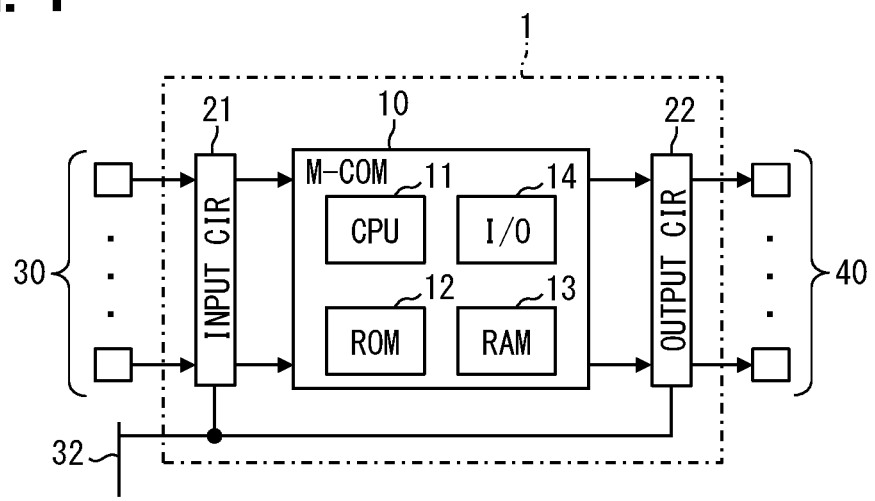
FIG. 1 is an overall diagram of a control system to which a task management apparatus according to a first embodiment is applied.

FIG. 1 shows a control system including a control apparatus 1, various input devices 30, and various output devices 40. The control apparatus 1, various input devices 30, and various output devices 40 are mounted on a vehicle. This vehicle is equipped with an engine (internal combustion engine) serving as a travel drive source. The control apparatus 1 controls the operation of the various output devices 40 based on the values detected by the various input devices 30.

Specific examples of the various output devices 40 include an injector for injecting fuel used for engine combustion, and an igniter for an ignition device used for engine ignition. Specific examples of the various input devices 30 include a rotation angle sensor, an intake air amount sensor, and a water temperature sensor. The rotation angle sensor outputs a pulse signal every time the crankshaft of the engine rotates by a predetermined angle. The intake air amount sensor outputs a detection signal corresponding to the air amount (intake air amount) taken into the engine combustion chamber. The water temperature sensor outputs a detection signal corresponding to the engine cooling water temperature.

The control apparatus 1 includes a microcomputer 10, an input circuit 21, and an output circuit 22. The input circuit 21 performs processing such as waveform shaping and A/D conversion of signals input from the various input devices 30. The output circuit 22 supplies drive power and outputs drive signals to the various output devices 40. The control apparatus 1 has a function of communicating with other control apparatuses through an in-vehicle LAN 32. For example, when some abnormality is detected in another control apparatus, a signal (abnormal signal) indicating that an abnormality has occurred is input to the input circuit 21.

For example, the microcomputer 10 calculates the number of rotations of the crankshaft per unit time (engine speed) based on the number of pulse signals output from the rotation angle sensor per unit time. The microcomputer 10 calculates the intake air amount based on the detection signal output from the intake air amount sensor. The intake air amount calculated in this way is used as an index representing the engine load. The microcomputer 10 calculates the cooling water temperature based on the detection signal output from the water temperature sensor.

The control apparatus 1 controls the operation of the injector (fuel injection control) or the operation of the igniter (ignition control) based on the calculated engine speed, engine load, cooling water temperature, and the like. As a result, engine operating conditions such as engine output and exhaust emission are controlled. Fuel injection control and ignition control are executed every time the crankshaft rotates by a predetermined angle. That is, the calculation processing load of the control apparatus 1 required for fuel injection control and ignition control increases as the engine speed increases.

The microcomputer 10 includes a processor (CPU 11), a nonvolatile memory (ROM 12), a volatile memory (RAM 13), and an input/output port (I/O port) to achieve a plurality of functions. Note that the microcomputer 10 may be provided as one or more microcomputers 10 to achieve the respective functions while the CPU 11 may be provided as one or more CPUs to achieve the respective functions. The memory related to the ROM 12 and the RAM 13 is a non-transitory tangible storage medium that is enabled to temporarily store "programs and/or data" that can be read by the processor. The storage medium is provided by a semiconductor memory. The program may be distributed as a single product unit or as a storage medium in which the program is stored.

The CPU 11 executes various programs stored in the ROM 12 while storing the calculation results in the RAM 13. Specific examples of the various programs include control programs for the various output devices 40 such as the fuel injection control and ignition control described above, programs for detecting electrical or mechanical abnormalities, and the like.

A task generated by execution of program or the like is a basic unit to be scheduled by the CPU 11. The CPU 11 executes a task by reading the program into the RAM 13 and using the register group of the CPU 11 and the stack area of the RAM 13. The task is configured to transition to a wait state, an executable state, and an execution state.

The execution state of a first task is a state in which the CPU 11 is assigned to the first task and the instructions are being executed. The executable state of a first task is a state where the first task is not executed because the CPU 11 is being used for a second task, but the CPU 11 can be used for the first task immediately after the CPU 11 is assigned to the first task. The wait state of a first task is a state where the first task is waiting for occurrence of an event, such as completion of input/output or arrival of a message from a second task. The CPU 11 is not assigned to the first task in the wait state until an event occurs.

Figure 2:
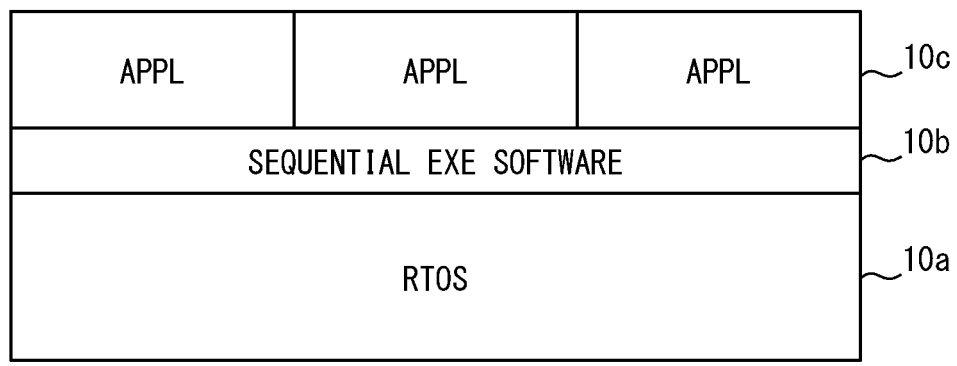
FIG. 2 is a configuration diagram of software resources according to the first embodiment.

FIG. 2 shows a hierarchical structure of software resources realized by the microcomputer 10. The software resource includes a real-time operating system (RTOS 10*a*), sequential execution software 10*b*, and various applications 10*c*.

The RTOS 10*a* performs control including activating, stopping, monitoring and the like of each application 10*c*. The RTOS 10*a* schedules tasks while restricting the period of time from when a task occurs to when the task is executed. For example, the RTOS 10*a* schedules tasks so as to prevent the period of time from when a hardware interrupt occurs to when the processing routine is called from exceeding the worst time value. For example, the RTOS 10*a* schedules tasks so as to ensure that a high priority task is executed reliably.

The sequential execution software 10*b* is software that enters between the application 10*c* and the RTOS 10*a*, and is also called middleware. When the application 10*c* issues a request to the middleware, the middleware issues a necessary request to the RTOS 10*a* and returns the result to the application 10*c*. Alternatively, the middleware itself performs control of each application 10*c*, including activating, stopping, monitoring, and the like.

In this specification, for example, an expression based on a program such as "task does . . . ", "RTOS does . . . ", and "sequential execution software 10*b* does . . . " is appropriately used. From the viewpoint of hardware, the main body is the microcomputer 10 or the CPU 11.

Figure 3:
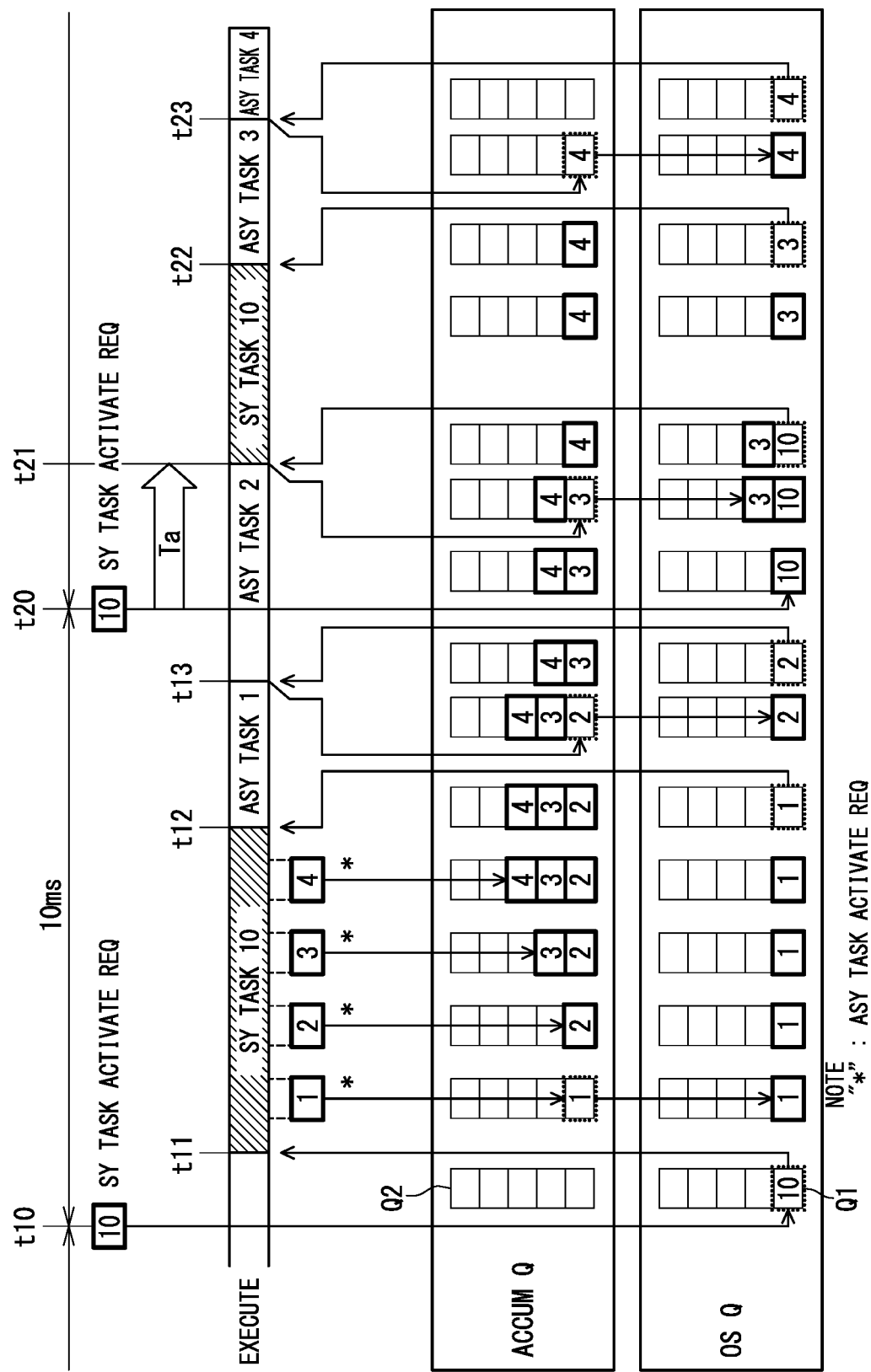
FIG. 3 is a time chart showing an example of control by the task management apparatus according to the first embodiment.

A buffer (storage area) for a queue for each task is reserved on the RAM 13. The queue is a data structure that holds data in a first-in first-out (FIFO) list structure. As shown in FIG. 3, the queue managed by the RTOS 10*a* is called an OS queue Q1 in this specification, and corresponds to a "task registration storage" or "task registration unit". The queue managed by the sequential execution software 10*b* is called an accumulation queue Q2 in this specification, and corresponds to a "task accumulation storage" or "task accumulation unit".

The various tasks that occur are classified into a time synchronous task that is requested to be activated at a constant time cycle and a time asynchronous task that is requested to be activated regardless of the time cycle. Hereinafter, a time synchronous task may also be referred to as a synchronous task; a time asynchronous task may also be referred to as an asynchronous task. Priorities are set for various tasks. The high priority task is assigned to the CPU 11 with priority over the low priority task. For example, if a high priority task occurs while a low priority task is being executed (i.e., under execution), the task execution order is managed to be set such that the low priority task being executed is interrupted and the high priority task is executed.

The asynchronous task is enqueued in the accumulation queue Q2, and then dequeued from the accumulation queue Q2 and enqueued in the OS queue Q1. At the time of arrival of the order of assignment of an asynchronous task to the CPU 11, such an asynchronous task enqueued in the OS queue Q1 is dequeued from the OS queue Q1 and executed by the CPU 11. That is, the asynchronous task is enqueued in the accumulation queue Q2 prior to being enqueued in the OS queue Q1.

An asynchronous task enqueued in the accumulation queue Q2 is permitted to be enqueued in the OS queue Q1 on condition that the number of asynchronous tasks registered in the OS queue Q1 is equal to or less than a predetermined registration number. In this embodiment, the predetermined registration number is set to one (1). Therefore, even if a large number of asynchronous tasks occur in a short time, a large number of asynchronous tasks are not enqueued in the OS queue Q1 at one time (once) in a short time, but are temporarily accumulated in the accumulation queue Q2. The accumulated asynchronous tasks are enqueued (moved) little by little from the accumulation queue Q2 to the OS queue Q1.

The point of time at which an asynchronous task moves from the accumulation queue Q2 to the OS queue Q1 is set to be a point of time when another asynchronous task is dequeued from the OS queue Q1 and executed. Therefore, each time an asynchronous task is dequeued from the OS queue Q1, the next asynchronous task may be enqueued in the OS queue Q1.

Note that, in an example of FIG. 3 described below, in cases where an asynchronous task is being executed, an asynchronous task accumulated in the accumulation queue Q2 may be prevented from being moved to the OS queue Q1 even if no asynchronous task is enqueued in the OS queue Q1. In other words, (i) in response to that no asynchronous task is enqueued in the OS queue Q1 during an execution of a time synchronous task, an asynchronous task accumulated in the accumulation queue Q2 may be moved to the OS queue Q1, or (ii) in response to that no asynchronous task is enqueued in the OS queue Q1 at the time when an execution of an asynchronous task is completed, an asynchronous task accumulated in the accumulation queue Q2 may be moved to the OS queue Q1.

The time synchronous task is enqueued in the OS queue Q1 without being enqueued in the accumulation queue Q2. That is, the time synchronous task is directly enqueued in the OS queue Q1 without being accumulated in the accumulation queue Q2. Time synchronous tasks include time synchronous tasks with different time cycles. For example, there are a time synchronous task that occurs at a time cycle of 10 ms, a time synchronous task that occurs at a time cycle of 3 ms, and the like. The example illustrated in FIG. 3 describes only a time synchronous task with a time cycle of 10 ms among a plurality of types of time synchronous tasks, for instance.

Next, an example of task execution order management described above will be described with reference to FIG. 3.

At the time t10, an activation request for a time synchronous task (10) occurs; then, at the time t20 when 10 ms has elapsed thereafter, an activation request for the next time synchronous task (10) occurs. Then, during the period of time from the time t10 to the time t20 (i.e., the interval of the time synchronous tasks (10)), four activation requests for the four asynchronous tasks (1), (2), (3), and (4) occur. These asynchronous tasks (1) to (4) and the time synchronous task (10) are all set to the same priority. In this specification, the occurrence of a task activation request may be simply expressed as the occurrence of a task.

The time synchronous task (10) occurring at the time t10 is immediately enqueued in the OS queue Q1. At this time of enqueue, (i) there is no other task that is in an executable state enqueued in the OS queue Q1, and (ii) there is no task that is in an execution state allocated to the CPU 11. Therefore, the time synchronous task (10) enqueued in the OS queue Q1 is immediately dequeued from the OS queue Q1, allocated to the CPU 11, and executed by the CPU 11.

The four asynchronous tasks (1) to (4) described above occur during the execution period of time from the time t11 of the execution start to the time t12 of the execution end of the time synchronous task (10). These asynchronous tasks (1) to (4) are immediately enqueued in the accumulation queue Q2 at the time of their respective occurrences (i.e., when the respective asynchronous tasks (1) to (4) occur).

At the point of time at which the asynchronous task (1) is enqueued in the accumulation queue Q2, no other asynchronous task in an executable state is enqueued in the OS queue Q1. The asynchronous task (1) enqueued in the accumulation queue Q2 is thus immediately dequeued and enqueued in the OS queue Q1.

At the point of time at which the asynchronous task (2) is enqueued in the accumulation queue Q2, the asynchronous task (1) is enqueued in the OS queue Q1. Therefore, the asynchronous task (2) enqueued in the accumulation queue Q2 is accumulated in the accumulation queue Q2 without being moved to the OS queue Q1. Similarly, the asynchronous tasks (3) and (4) are accumulated in the accumulation queue Q2 without being moved to the OS queue Q1.

Thereafter, at the time t12 of the execution end of the time synchronous task (10), the asynchronous task (1) enqueued in the OS queue Q1 is immediately dequeued, allocated to the CPU 11, and executed. In contrast, the asynchronous tasks (2), (3), and (4) remain in the accumulation queue Q2 during an execution of the asynchronous task (1).

Thereafter, at the time t13 of the execution end of the asynchronous task (1), no other asynchronous task is enqueued in the OS queue Q1. The asynchronous task (2) enqueued in the accumulation queue Q2 is thus immediately dequeued from the accumulation queue Q2 and enqueued in the OS queue Q1. At this enqueue time, no other task that is in an executable state is enqueued in the OS queue Q1. Therefore, the asynchronous task (2) enqueued in the OS queue Q1 is immediately dequeued from the OS queue Q1, allocated to the CPU 11, and executed by the CPU 11. In contrast, the asynchronous tasks (3) and (4) remain in the accumulation queue Q2 during an execution of the asynchronous task (2).

The next time synchronous task (10) occurs at the time t20 during the execution period of time of the asynchronous task (2). The time synchronous task (10) having occurred at the time t20 is immediately enqueued in the OS queue Q1. At this time of enqueue, the asynchronous task (2) is in an execution state. Therefore, the time synchronous task (10) is held in the OS queue Q1 in an executable state.

Thereafter, at the time t21 of the execution end of the asynchronous task (2), no other asynchronous task is enqueued in the OS queue Q1. The asynchronous task (3) enqueued in the accumulation queue Q2 is thus immediately dequeued from the accumulation queue Q2 and enqueued in the OS queue Q1, whereas the asynchronous task (4) remains in the accumulation queue Q2 during an execution of the asynchronous task (3). Further, at the time t21 of the execution end of the asynchronous task (2), the time synchronous task (10) enqueued in the OS queue Q1 is immediately dequeued from the OS queue Q1, allocated to the CPU 11, and executed by the CPU 11.

Note that during the execution period of time of the asynchronous task (1), the subsequent asynchronous tasks (2), (3), and (4) are not enqueued in the OS queue Q1, but are accumulated in the accumulation queue Q2. The time synchronous task (10) occurring during the accumulation period of the asynchronous tasks (i.e., the time synchronous task (10) occurring after the asynchronous tasks (2) (3) (4)) can be enqueued in the queue Q1 before the asynchronous tasks (3) (4). The period of time from the time t20 of the occurrence of the time synchronous task (10) to the time t21 of the execution start of the time synchronous task (10) corresponds to an activation delay time Ta (see the arrow in FIG. 3) of the time synchronous task (10).

At the time t21 of the execution start of the time synchronous task (10), the asynchronous task (3) is dequeued from the accumulation queue Q2 and enqueued in the OS queue Q1. Thereafter, at the time t22 of the execution end of the time synchronous task (10), the asynchronous task (3) enqueued in the OS queue Q1 is immediately dequeued from the OS queue Q1, allocated to the CPU 11, and executed by the CPU 11.

Thereafter, at the time t23 of the execution end of the asynchronous task (3), no other asynchronous task is enqueued in the OS queue Q1. Therefore, the asynchronous task (4) enqueued in the accumulation queue Q2 is immediately dequeued from the accumulation queue Q2 and enqueued in the OS queue Q1. At the time of this enqueue, no other task is enqueued in the OS queue Q1. Therefore, the asynchronous task (4) enqueued to the OS queue Q1 is immediately dequeued, assigned to the CPU 11, and executed by the CPU 11.

Next, a process for controlling the task execution order described above will be described with reference to FIGS. 4 to 7. These processes are repeatedly executed by the microcomputer 10 at a predetermined calculation cycle during the period of time in which the power is supplied to the control apparatus 1.

Figure 4:
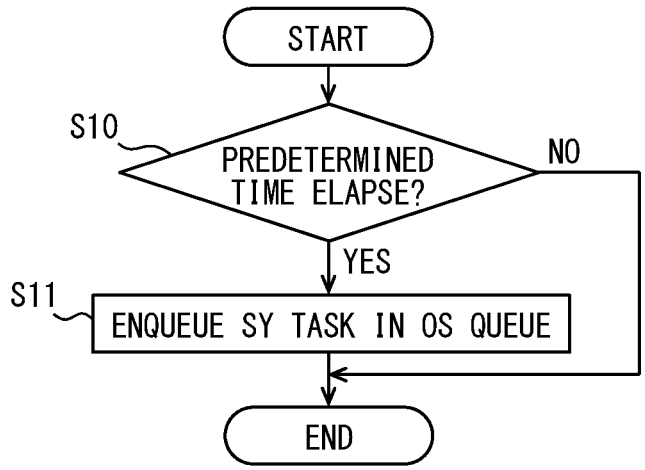
FIG. 4 is a flowchart showing a process at the time of occurrence of a time synchronous task by the task management apparatus according to the first embodiment.

FIG. 4 shows a flowchart of a process for the time synchronous task. First, in S10, it is determined whether or not a predetermined period of time has elapsed since the time synchronous task occurred last time. This predetermined period of time is set to the time cycle described above. The determination in S10 is executed for each of a plurality of types of time synchronous tasks. If it is determined that the predetermined period of time has elapsed, the corresponding type of time synchronous task is enqueued in the OS queue Q1 in the subsequent S11.

Figure 5:
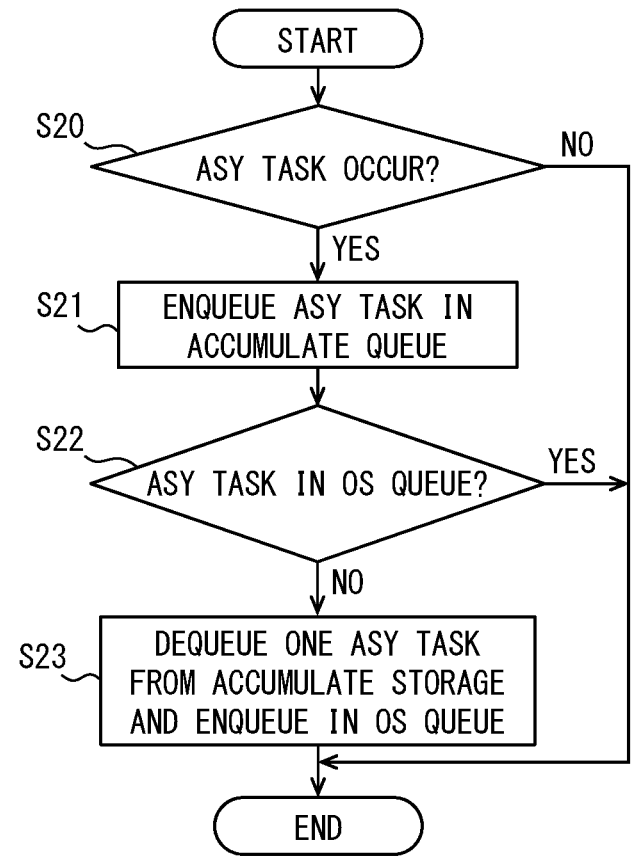
FIG. 5 is a flowchart showing a process at the time of occurrence of a time asynchronous task by the task management apparatus according to the first embodiment.

FIG. 5 shows a flowchart of a process for an asynchronous task. First, in S20, it is determined whether or not an asynchronous task has occurred. For example, when an abnormal signal is input to the control apparatus 1 from another control apparatus through the in-vehicle LAN 32, a task that occurs due to the input of the abnormal signal is a specific example of an asynchronous task. When it is determined that an asynchronous task has occurred, the occurring asynchronous task is enqueued in the accumulation queue Q2 in S21. In subsequent S22, it is determined whether there is an asynchronous task enqueued in the OS queue Q1. If it is determined that there is no asynchronous task, then in S23, one asynchronous task is dequeued from the accumulation queue Q2 and enqueued in the OS queue Q1. That is, one asynchronous task is moved from the accumulation queue Q2 to the OS queue Q1. If it is determined that there is an asynchronous task enqueued in the OS queue Q1, the movement is prohibited. Note that, in the above-described example of FIG. 3, in cases where an asynchronous task is being executed, an asynchronous task accumulated in the accumulation queue Q2 may be prevented from being moved to the OS queue Q1.

Figure 6:
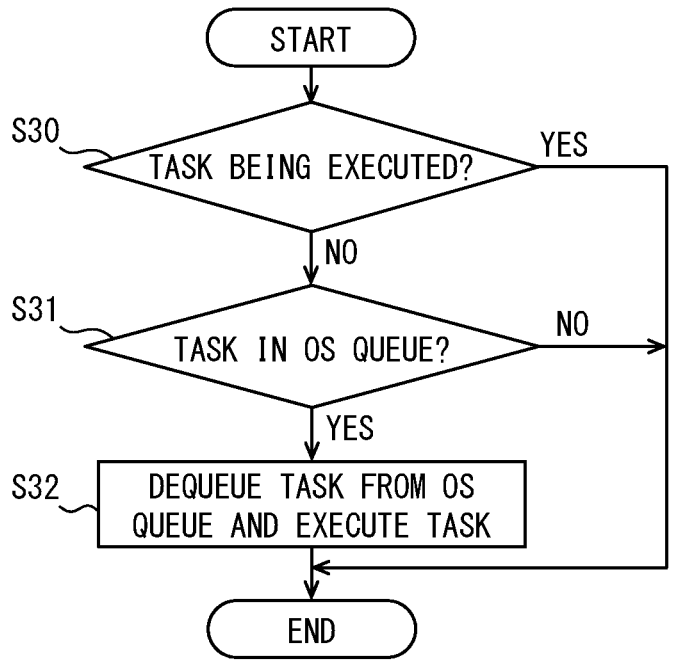
FIG. 6 is a flowchart showing a process at the time of activation of a task by the task management apparatus according to the first embodiment.

FIG. 6 shows a flowchart of a process for dequeuing from the OS queue Q1. First, in S30, it is determined whether there is a task being executed. If it is determined that there is no task being executed, it is determined in S31 that there is a task enqueued in the OS queue Q1. If it is determined that there is a task, in the subsequent S32, the task first enqueued in the OS queue Q1 is dequeued from the OS queue Q1 and activated.

Figure 7:
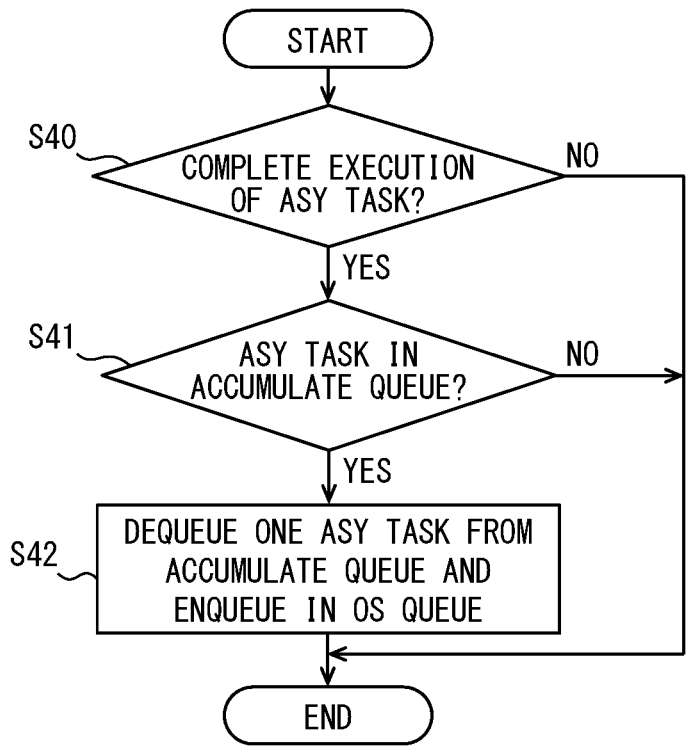
FIG. 7 is a flowchart illustrating a process at the time of completion of execution of a time asynchronous task by the task management apparatus according to the first embodiment.

FIG. 7 shows a flowchart of a process for dequeuing from the accumulation queue Q2. First, in S40, it is determined whether or not the execution of the asynchronous task is completed. If it is determined that the execution is completed, it is determined in subsequent S41 whether or not there is an asynchronous task enqueued in the accumulation queue Q2. If it is determined that there is a task, then in S42, one asynchronous task is dequeued from the accumulation queue Q2, and moved to be enqueued in the OS queue Q1.

By executing the control of FIGS. 4 to 7 described above, the execution order of the time synchronous task (10) and the asynchronous tasks (1) to (4) is controlled as illustrated in FIG. 3. Note that the microcomputer 10 executing the process of S32 corresponds to an "execution control unit" that executes a task enqueued in the OS queue Q1 in accordance with the enqueue order and task priority. The microcomputer 10 executing the process of S21 corresponds to an "accumulation control unit" that enqueues and accumulates an asynchronous task in the accumulation queue Q2 prior to enqueuing in the OS queue Q1. The microcomputer 10 executing the processes of S23 and S42 corresponds to an "accumulation management unit" that dequeues an asynchronous task enqueued in the accumulation queue Q2 from the accumulation queue Q2 and enqueues it in the OS queue Q1. Further, the microcomputer 10 provides a "task management apparatus".

<Operational Effects>

Hereinafter, the effects of the above-described configuration will be described by comparing a task management apparatus as a comparative example of the present embodiment with reference to FIG. 15. This comparative example is a task management apparatus in which the above-described accumulation queue Q2 is abolished, and the occurring asynchronous task is enqueued in the OS queue Q1 at the time of occurrence without being accumulated in the accumulation queue Q2. Suppose a case where four asynchronous tasks (1) to (4) occur during the execution period of time of the time synchronous task (10). In such a case, after these asynchronous tasks (1) to (4) are sequentially executed, the execution of the next time synchronous task (10) is started. Therefore, the activation delay time Ta of the time synchronous task (10) becomes longer.

Note that if the priority of the time synchronous task is higher than the priority of the asynchronous task, the following will arise. That is, in the situation of FIG. 15 in which a large number of asynchronous tasks occur during the interval of the time synchronous tasks (10), the asynchronous task (2) being executed is interrupted and the time synchronous task (10) is executed. Therefore, the activation delay of the time synchronous task (10) is eliminated. However, due to the interruption of the asynchronous task (2), there may be an issue of task interference such as inconsistency between data processed by the asynchronous task (2) and data processed by the time synchronous task (10).

In contrast, the task management apparatus according to the present embodiment includes an execution control unit, an accumulation control unit, and an accumulation management unit. Therefore, as shown in FIG. 3, the execution of the next time synchronous task (10) occurring after the asynchronous tasks (3) and (4) is activated before those asynchronous tasks (3) and (4). Therefore, a time synchronous task occurring after an asynchronous task can be enqueued to the OS queue Q1 before the asynchronous task without setting the priority of the time synchronous task to be higher than the priority of the asynchronous task. Therefore, the activation delay time Ta of the time synchronous task can be shortened without causing task interference due to interruption of the asynchronous task being executed.

Further, in the present embodiment, when the asynchronous task is dequeued from the accumulation queue Q2 and moved to be enqueued in the OS queue Q1, the accumulation management unit moves asynchronous tasks accumulated in the accumulation queue Q2 one by one (i.e., one asynchronous task by one asynchronous task) to the OS queue Q1. For this reason, the activation delay time Ta can be further shortened as compared with the case of enqueueing or moving a plurality of queues.

For example, on condition that two asynchronous tasks are enqueued in the OS queue Q1, if the time synchronous task occurs during the execution of the first asynchronous task, the activation delay time Ta becomes long as follows. That is, after the execution of the first asynchronous task is completed, the time synchronous task that has already occurred cannot be executed, and the second asynchronous task is executed. Then, after the execution of these two asynchronous tasks is completed, the execution of the time synchronous task is then started. In contrast, when enqueueing one by one, the time synchronous task is executed prior to the second asynchronous task, so the activation delay time Ta is shortened accordingly.

Furthermore, in the present embodiment, sequential execution software that is in a layer (middleware) different from the RTOS 10a manages the storage area of the accumulation queue Q2. Therefore, a function of accumulating asynchronous tasks in the accumulation queue Q2 can be added by adding sequential execution software without changing the function of the RTOS 10a.

Second Embodiment

In the first embodiment, the asynchronous task enqueued in the accumulation queue Q2 is moved one by one to the OS queue Q1 when the asynchronous task is dequeued from the accumulation queue Q2 and moved to be enqueued in the OS queue Q1. In contrast, in the second embodiment, the number of movements (predetermined number) is variably set.

Specifically, the above-described variable setting is realized by changing the processing of FIGS. 5 and 7 described above to the processing of FIGS. 8 and 9. That is, S23 in FIG. 5 is changed to S23A, S23B, and S23C in FIG. 8; S42 in FIG. 7 is changed to S42A, S42B, and S42C in FIG. 9.

Figure 8:
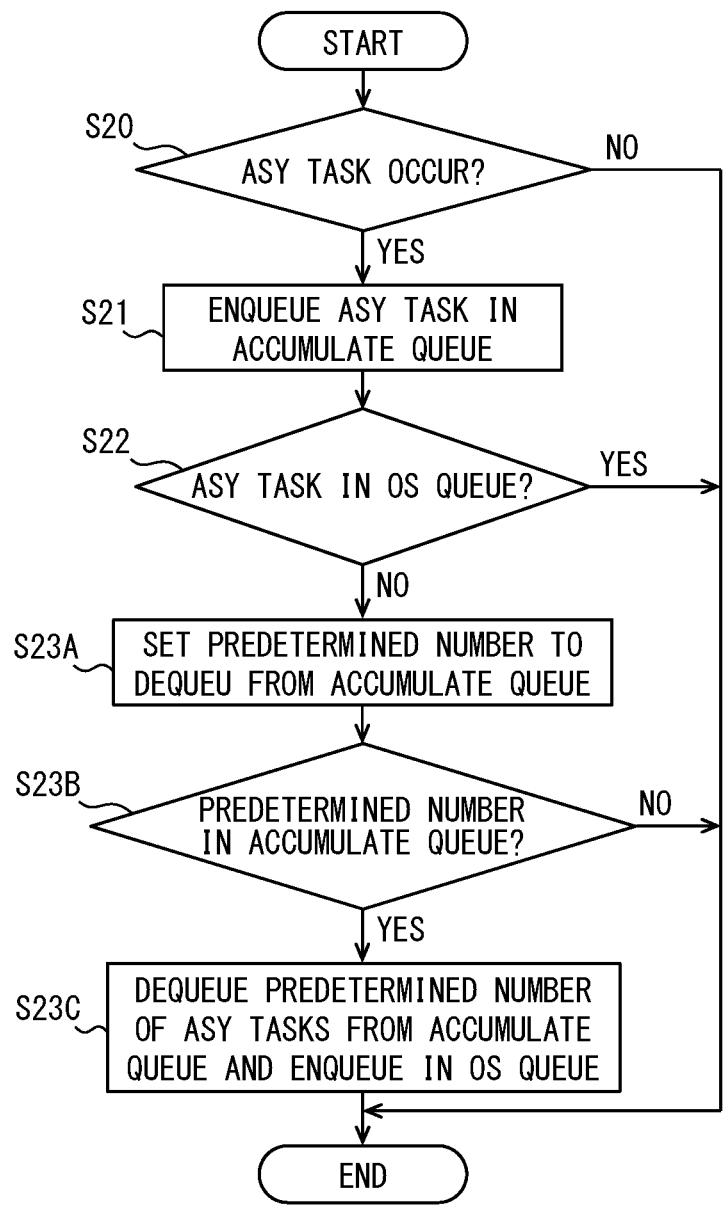
FIG. 8 is a flowchart showing a process at the time of occurrence of a time asynchronous task by the task management apparatus according to a second embodiment.

In S23A of FIG. 8, a predetermined number dequeued from the accumulation queue Q2 once is set according to the condition. For example, the larger the processing load of the microcomputer 10 is, the larger the predetermined number is set. More specifically, the predetermined number is set to a larger number as the processing load for executing the time synchronous task and the asynchronous task is larger. Alternatively, the predetermined number is set such that the number in a previous period of time from when the control apparatus 1 is powered to be activated to a predetermined point of time is set to be smaller (for example, one (1)) than that in a subsequent period of time after the predetermined point of time. For example, the predetermined point of time is the time when the output signal from the rotation angle sensor is first input to the control apparatus 1 after the start of the control apparatus 1.

In subsequent S23B, it is determined whether or not there are a predetermined number or more of asynchronous tasks in the accumulation queue Q2. If it is determined that there are equal to or more than the predetermined number, in the subsequent S23C, the predetermined number of asynchronous tasks set in S23A are dequeued from the accumulation queue Q2 and enqueued in the OS queue Q1. Note that, in the above-described example of FIG. 3, in cases where an asynchronous task is being executed, an asynchronous task accumulated in the accumulation queue Q2 may be prevented from being moved to the OS queue Q1.

Figure 9:
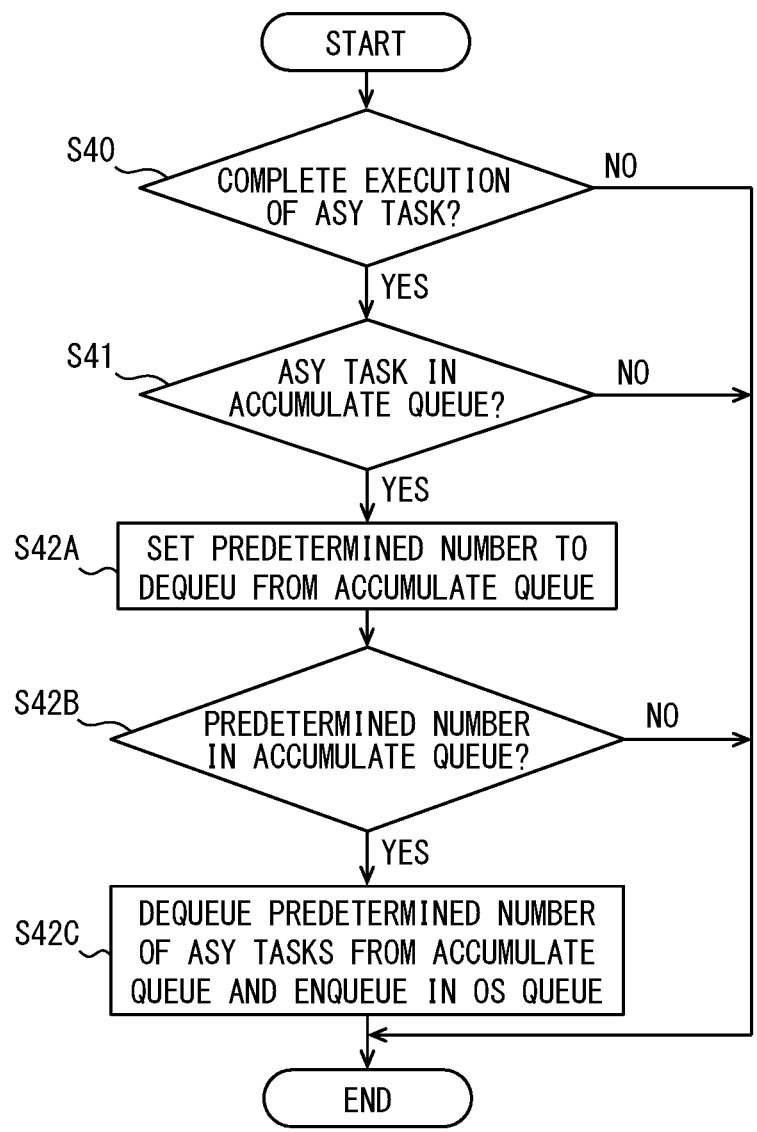
FIG. 9 is a flowchart showing a process at the time of completion of execution of a time asynchronous task by the task management apparatus according to the second embodiment.

In addition, each process by S42A, S42B, and S42C of FIG. 9 is the same as each process by S23A, S23B, and S23C of FIG. 8. The microcomputer 10 executing the processes of S23A and S42A corresponds to an "enqueue number setting unit" that variably sets the predetermined number according to conditions.

<Operational Effects>

As described above, according to the present second embodiment, the predetermined number is set to a larger value as the processing load of the microcomputer 10 is larger. As the number of asynchronous tasks to be moved once (at one time) is increased, the processing load on the microcomputer 10 caused by the movement is reduced. In view of this point, according to the present embodiment, the processing load caused by the movement of the asynchronous task decreases as the processing load of the microcomputer 10 increases in the task execution process or the like. For this reason, the processing load generated by the entire task execution and task movement is reduced.

Third Embodiment

In the first embodiment, the asynchronous task enqueued in the accumulation queue Q2 is executed after being moved to the OS queue Q1. In contrast, in a third embodiment, an execution request task is provided which requests execution of an asynchronous task enqueued in the accumulation queue Q2. Such an execution request is generated and enqueued in the OS queue Q1. Then, in response to that the execution request task is dequeued from the OS queue Q1 and executed, the asynchronous task enqueued in the accumulation queue Q2 is executed without being moved to the OS queue Q1.

Next, an example of task execution order management described above will be described with reference to FIG. 10.

The time synchronous task (10) occurring at the time t10 is immediately enqueued in the OS queue Q1, and immediately allocated to the CPU 11 and executed by the CPU 11. During the execution period of time from the time t11 of the execution start to the time t12 of the execution end of the time synchronous task (10), the occurring asynchronous tasks (1) to (4) are immediately enqueued in the accumulation queue Q2 at the time of occurrence.

At the point of time at which the asynchronous task (1) is enqueued in the accumulation queue Q2, no other asynchronous task in an executable state is enqueued in the OS queue Q1. Therefore, an execution request task (q) that requests execution of the asynchronous task (1) enqueued in the accumulation queue Q2 is immediately generated and enqueued in the OS queue Q1. At the time when a subsequent asynchronous task (2) is accumulated in the accumulation queue Q2, the execution request task (q) that requests execution of the asynchronous task (1) is already enqueued in the OS queue Q1. Therefore, an execution request task (q) that requests execution of the asynchronous task (2) enqueued in the accumulation queue Q2 is neither generated nor enqueued in the OS queue Q1. Similarly, an execution request task (q) that requests execution of each of an asynchronous task (3) and an asynchronous task (4) enqueued in the accumulation queue Q2 is neither generated nor enqueued in the OS queue Q1.

Thereafter, at the time t12 of the execution end of the time synchronous task (10), the execution request task (q) enqueued in the OS queue Q1 is immediately dequeued, allocated to the CPU 11, and executed. As a result, the asynchronous task (1) enqueued in the accumulation queue Q2 is dequeued from the accumulation queue Q2 and executed. In contrast, during an execution of the asynchronous task (1), an execution request task (q) that requests execution of each of the asynchronous tasks (2), (3), and (4) enqueued in the accumulation queue Q2 is neither generated nor enqueued in the OS queue Q1.

Thereafter, at the time t13 of the execution end of the asynchronous task (1), no other task is enqueued in the OS queue Q1. The execution request task (q) is thus immediately generated and enqueued in the OS queue Q1, and then executed immediately. As a result, the asynchronous task (2) enqueued in the accumulation queue Q2 is dequeued from the accumulation queue Q2 and executed. In contrast, during an execution of the asynchronous task (2), an execution request task (q) that requests execution of each of the asynchronous tasks (3), and (4) enqueued in the accumulation queue Q2 is neither generated nor enqueued in the OS queue Q1.

The next time synchronous task (10) occurs at the time t20 during the execution period of the asynchronous task (2), and is immediately enqueued in the OS queue Q1. At this time of enqueue, the asynchronous task (2) is in an execution state. Therefore, the time synchronous task (10) is held in the OS queue Q1 in an executable state.

Thereafter, at the time t21 of the execution end of the asynchronous task (2), the execution request task (q) is not enqueued in the OS queue Q1. Therefore, the execution request task (q) requesting execution of the asynchronous task (3) is immediately generated and enqueued in the OS queue Q1. In contrast, an execution request task (q) that requests execution of the asynchronous task (4) enqueued in the accumulation queue Q2 is neither generated nor enqueued in the OS queue Q1. Furthermore, at the time t21 of the execution end of the asynchronous task (2), the time synchronous task (10) enqueued in the OS queue Q1 is immediately dequeued and executed.

Note that during the execution period of time of the asynchronous task (1), the subsequent asynchronous tasks (2), (3), and (4) are not enqueued in the OS queue Q1, but are accumulated in the accumulation queue Q2. Further, note that during the execution period of time of the asynchronous task (1), any execution request (q) that requests execution of the subsequent respective asynchronous tasks (2), (3), and (4) enqueued in the accumulation queue Q2 is not generated. The time synchronous task (10) occurring during the accumulation period (i.e., the time synchronous task (10) occurring after the asynchronous task (2) (3) (4)) is thus executed before the asynchronous task (3) (4). The period of time from the time t20 of the occurrence of the time synchronous task (10) to the time t21 of the execution start corresponds to the activation delay time Ta of the time synchronous task (10).

At the time t21 of the execution start of the time synchronous task (10), an execution request task (q) that requests execution of the asynchronous task (3) enqueued in the accumulation queue Q2 is generated and enqueued in the OS queue Q1. Thereafter, the execution request task (q) request task (q) that requests execution of the asynchronous task (3) enqueued in the OS queue Q1 is immediately executed at the time t22 of the execution end of the time synchronous task (10). As a result, the asynchronous task (3) enqueued in the accumulation queue Q2 is dequeued from the accumulation queue Q2 and executed.

Thereafter, at the time t23 of the execution end of the asynchronous task (3), the execution request task (q) is not enqueued in the OS queue Q1. Therefore, the execution request task (q) that requests execution of the asynchronous task (4) enqueued in the accumulation queue Q2 is immediately generated, enqueued in the OS queue Q1, and executed, and by this execution, the asynchronous task (4) is dequeued from the accumulation queue Q2 and executed.

Next, the process for controlling the task execution order described above will be described with respect to differences from FIGS. 4 to 7 according to the first embodiment.

The processing contents of FIGS. 4 and 6 are the same in the present embodiment. The above-described control of execution request task generation is realized by changing the processes of FIG. 5 and FIG. 7 to the processes of FIG. 11 and FIG. 12. That is, S22 and S23 in FIG. 5 are changed to S230 and S230 in FIG. 11; S42 in FIG. 7 is changed to S420 in FIG. 12.

Figure 10:
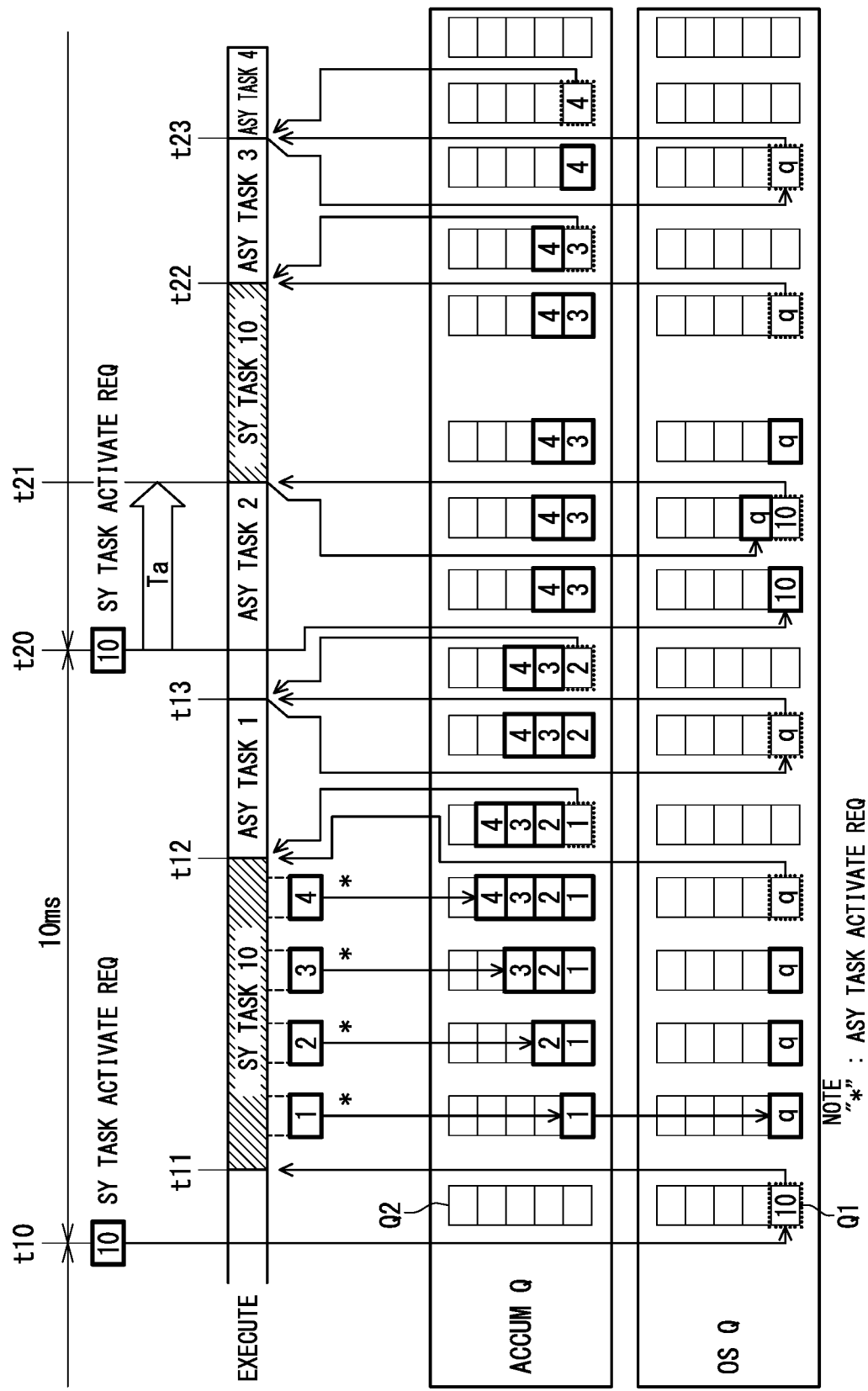
FIG. 10 is a time chart showing an example of control by the task management apparatus according to a third embodiment.
Figure 11:
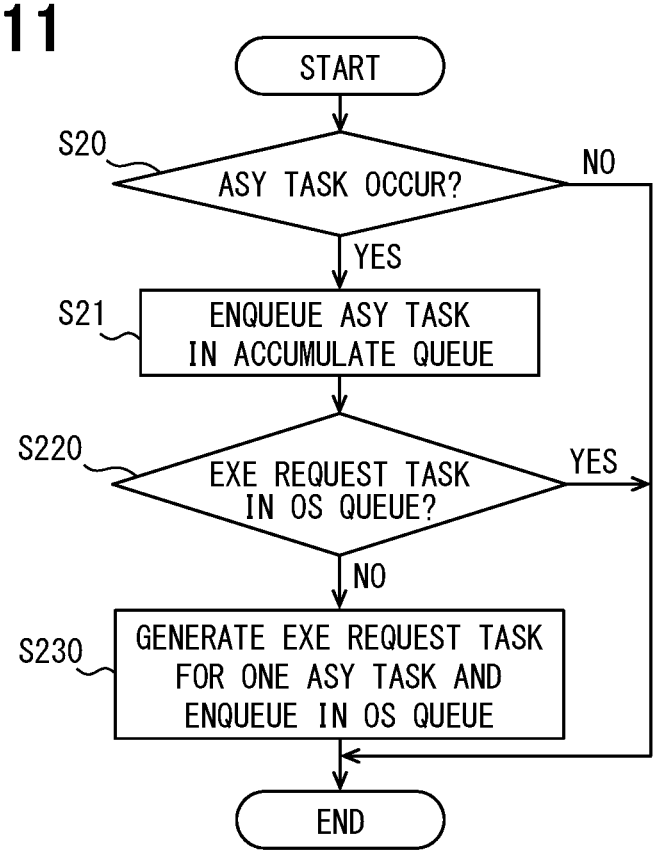
FIG. 11 is a flowchart showing a process at the time of occurrence of a time asynchronous task by the task management apparatus according to the third embodiment.
Figure 12:
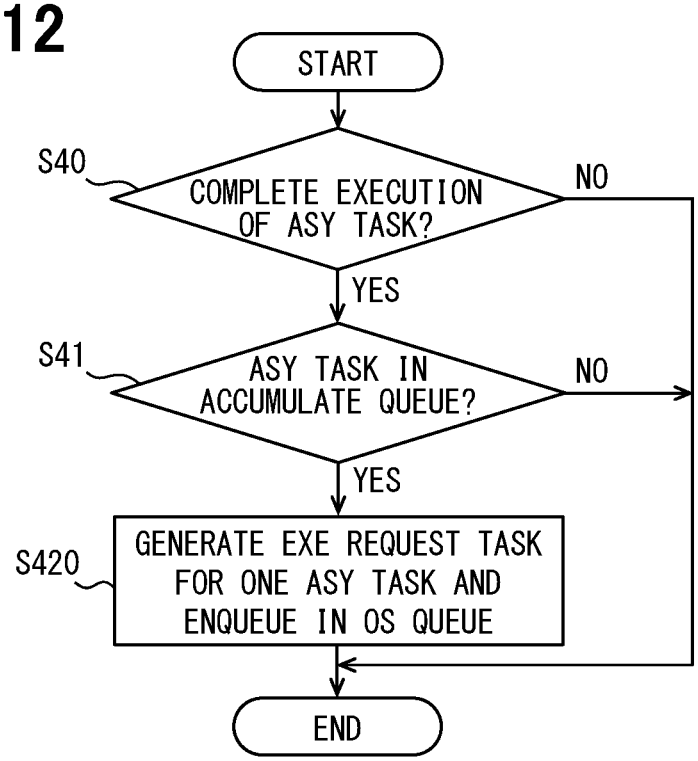
FIG. 12 is a flowchart showing a process at the time of completion of execution of a time asynchronous task by the task management apparatus according to the third embodiment.

In S220 of FIG. 11, it is determined whether or not there is an execution request task in the OS queue Q1. If it is determined that there is no execution request task, in the next S230, an execution request task is generated, and the generated execution request task is enqueued in the OS queue Q1. Note that in the example of FIG. 10 described above, during an execution of the asynchronous task, an execution request task is neither generated nor enqueued in the OS queue Q1. The execution request task is a task that requests execution of one asynchronous task accumulated in the accumulation queue Q2. Note that the processing in S420 in FIG. 12 is the same as the processing in S230 in FIG. 11.

In short, according to the processing of S230 and S420, the execution request task is generated when (i) there is no task enqueued in the OS queue Q1 and (ii) the asynchronous task is accumulated in the accumulation queue Q2. The execution request task is enqueued in the OS queue Q1. The microcomputer 10 executing such processing of S230 and S420 corresponds to an "asynchronous task control unit" that generates an execution request task and enqueues it in the OS queue Q1.

<Operational Effects>

As described above, according to the present third embodiment, the same effects as those of the first embodiment can be obtained. That is, the task management apparatus according to the present embodiment includes an execution control unit, an accumulation control unit, and an asynchronous task control unit. Therefore, as shown in FIG. 10, the execution of the next time synchronous task (10) occurring after the asynchronous tasks (3) and (4) is started before those asynchronous tasks (3) and (4). Therefore, the time synchronous task occurring after the asynchronous task can be enqueued in the OS queue Q1 before the asynchronous task without setting the priority of the time synchronous task to be higher than the priority of the asynchronous task. Therefore, the activation delay time Ta of the time synchronous task can be shortened without causing task interference due to interruption of the asynchronous task being executed.

Furthermore, in the present embodiment, the execution request task generated by the asynchronous task control unit is a task that requests execution of one asynchronous task accumulated in the accumulation queue Q2. Therefore, the activation delay time Ta can be further shortened as compared with the case of executing a plurality of asynchronous tasks.

For example, on condition that the execution request task causes two asynchronous tasks of a first asynchronous task and a second asynchronous task to be executed, if a time synchronous task occurs during the execution of the first asynchronous task, the activation delay time Ta becomes long as follows. That is, after the execution of the first asynchronous task is completed, the time synchronous task that has already occurred cannot be executed, and the second asynchronous task is executed. Then, after the execution of these two time synchronous tasks is completed, the execution of the time synchronous task is then started. In contrast, when enqueueing one by one, the time synchronous task is executed prior to the second asynchronous task, so the activation delay time Ta is shortened accordingly.

Fourth Embodiment

In the third embodiment, the asynchronous task enqueued in the accumulation queue Q2 is dequeued and executed one by one every time the execution request task is executed. In contrast, in a fourth embodiment, the number (predetermined number) of asynchronous tasks to be executed each time the execution request task is executed is variably set.

Specifically, the above-described variable setting is realized by changing the processes of FIGS. 11 and 12 described above to the processes of FIGS. 13 and 14. That is, S230 in FIG. 11 is changed to S230A, S230B, and S230C in FIG. 13; S420 in FIG. 12 is changed to S420A, S420B, and S420C in FIG. 14.

Figure 13:
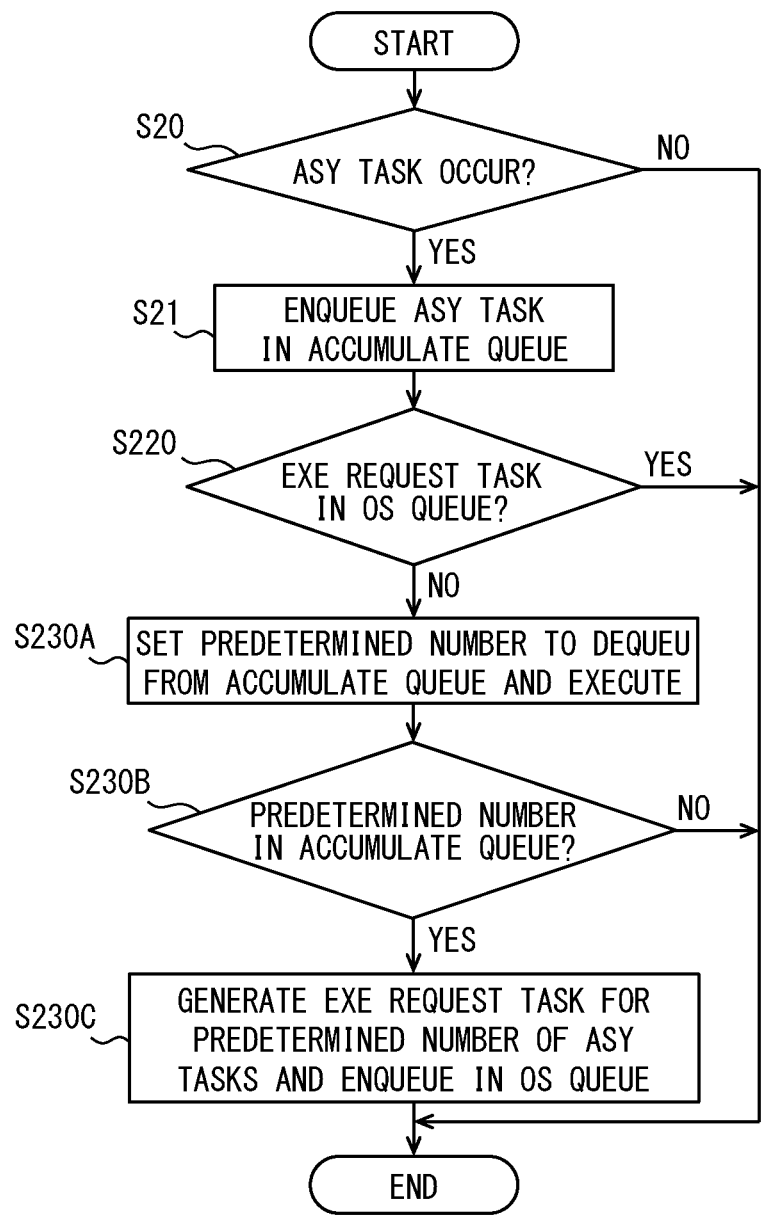
FIG. 13 is a flowchart showing a process at the time of occurrence of a time asynchronous task by the task management apparatus according to a fourth embodiment.

In S230A of FIG. 13, the predetermined number is set according to conditions. For example, the larger the processing load of the microcomputer 10 is, the larger the predetermined number is set. More specifically, the predetermined number is set to a larger number as the processing load for executing the time synchronous task and the asynchronous task is larger. Alternatively, the predetermined number is set such that the number in a previous period of time from when the control apparatus 1 is powered to be activated to a predetermined point of time is set to be smaller (for example, one) than that in a subsequent period of time after the period point of time. For example, the predetermined point of time is the time when the output signal from the rotation angle sensor is first input to the control apparatus 1 after the start of the control apparatus 1.

In subsequent S230B, it is determined whether or not there are a predetermined number or more of asynchronous tasks in the accumulation queue Q2. If it is determined that there are a predetermined number or more, in the subsequent S230C, an execution request task for executing the predetermined number of asynchronous tasks set in S230A is generated. The execution request task is enqueued in the OS queue Q1. Note that in the example of FIG. 10 described above, during an execution of the asynchronous task, an execution request task is neither generated nor enqueued in the OS queue Q1. The microcomputer 10 executing the processing of S230C and S420C corresponds to an "asynchronous task control unit" that generates an execution request task and enqueues it in the OS queue Q1.

Figure 14:
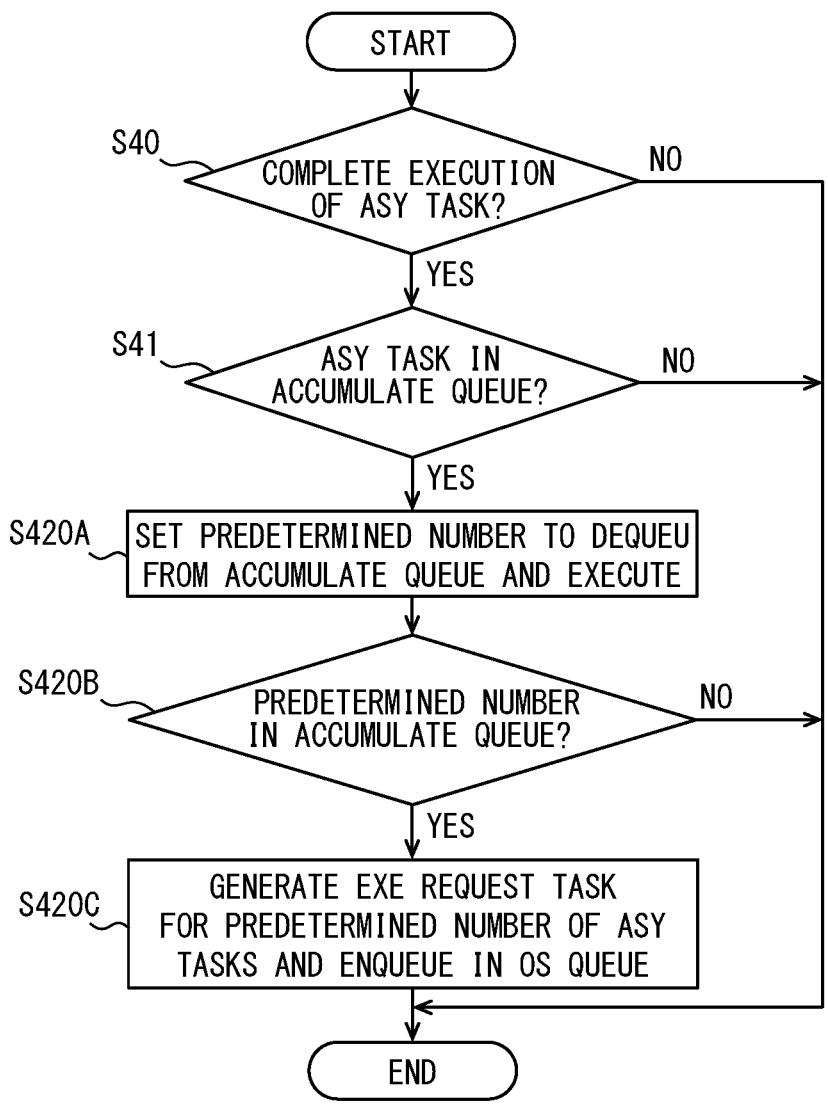
FIG. 14 is a flowchart illustrating a process at the completion of execution of a time asynchronous task by the task management apparatus according to the fourth embodiment.

Note that the processing by S420A, S430B, and S430C in FIG. 14 is the same as the processing by S230A, S230B, and S230C in FIG. 13. The microcomputer 10 when executing the processes of S230A and S420A corresponds to an "execution request number setting unit" that variably sets the predetermined number according to conditions.

<Operational Effects>

As described above, according to the present embodiment, the predetermined number is set to a larger value as the processing load of the microcomputer 10 is larger. And the processing load of the microcomputer 10 becomes small, so that there are many asynchronous tasks performed by one activation by an execution request task. In view of this point, according to the present embodiment, the larger the processing load of the microcomputer 10 in task execution processing or the like, the smaller the processing load caused by the execution of the execution request task. The processing load on the microcomputer 10 is thus reduced.

Other Embodiments

Although the multiple embodiments of the present disclosure have been described above, not only the combinations of the configurations explicitly shown in the description of each embodiment, but also the configurations of multiple embodiments may be partially combined even if those are not explicitly shown unless a problem arises in the combination in particular. It should be understood that such unspecified combinations of configurations described in various embodiments and modification examples are also disclosed by the following description.

In the first embodiment, when an asynchronous task accumulated in the accumulation queue Q2 is dequeued from the accumulation queue Q2 and moved to be enqueued in the OS queue Q1, the asynchronous tasks accumulated in the accumulation queue Q2 are enqueued one by one in the OS queue Q1. In contrast, a plurality of asynchronous tasks under the same situation may be enqueued collectively in the OS queue Q1.

In the third embodiment, the execution request task is a task that requests execution of one asynchronous task accumulated in the OS queue Q1. In contrast, the execution request task may be a task that requests execution of a plurality of asynchronous tasks accumulated in the accumulation queue Q2.

The first embodiment may be modified as follows. That is, the asynchronous task enqueued in the accumulation queue Q2 may be enqueued in the OS queue Q1 on condition that the number of asynchronous tasks registered in the OS queue Q1 is equal to or less than a predetermined registration number. The predetermined number of registrations may be plural or one. Note that the smaller the predetermined number of registrations, the greater the effect of suppressing the activation delay of the time synchronous task.

In the first embodiment, in the situation illustrated in FIG. 3, the point of time of moving the asynchronous task (2) from the accumulation queue Q2 to the OS queue Q1 is the point of time of the execution end of the asynchronous task (1). In contrast, the point of time may be the point of time at which the asynchronous task (1) is dequeued from the OS queue Q1, that is, the time t12 of the execution start of the asynchronous task (1). However, the effect of suppressing the activation delay of the time synchronous task is greater in cases that the point of time of moving the asynchronous task (2) from the accumulation queue Q2 to the OS queue Q1 is the point of time of the execution end of the asynchronous task (1).

For reference to further explain features of the present disclosure, the description is added as follows.

There is a RTOS that manages the execution order of tasks that occur sequentially. Tasks enqueued in the RTOS are executed in the order of enqueue. Note that a priority is preset for each task. If a high priority task is enqueued while a low priority task is being executed, the RTOS interrupts the low priority task being executed and executes the high priority task.

Here, the occurring task is classified into a time synchronous task that is requested to be activated at a constant time cycle or a time asynchronous task that is requested to be activated regardless of the time cycle. When a large number of asynchronous tasks occur during the interval of the time synchronous tasks, the followings are concerned. That is, suppose a case where the priority of time asynchronous tasks that occurred in large numbers during the interval of the time synchronous tasks is the same as the priority of time synchronous tasks. In such a case, after all the time asynchronous tasks that have occurred in large quantities are executed completely, the time synchronous task will be executed. Therefore, the execution waiting time of the time synchronous task becomes long, and the activation delay of the time synchronous task arises.

Further, suppose a case where the priority of the time synchronous task is set to be higher than the priority of the time asynchronous task. In such a case, even in the above situation where a large number of time asynchronous tasks occur, the time asynchronous task being executed is interrupted and the time synchronous task is executed. This eliminates the activation delay of the time synchronous task. The interruption of the asynchronous task may however pose an issue of task interference such as inconsistency between data processed by the time asynchronous task and data processed by the time synchronous task.

It is thus desired to provide a task management apparatus that can suppress an activation delay of a time synchronous task while suppressing task interference.

Examples of the present disclosure described herein are set forth in the following clauses.

According to a first example, a task management apparatus is provided to manage an execution order of a time synchronous task that is requested to be activated at a constant time cycle and a time asynchronous task that is requested to be activated regardless of a time cycle. The task management apparatus includes an execution control unit, a task accumulation unit, and an accumulation management unit. The execution control unit is configured to execute the time synchronous task and the time asynchronous task, which are enqueued in a task registration storage, in accordance with an enqueue order and task priority. The task accumulation unit is configured to enqueue and accumulate the time asynchronous task in a task accumulation storage prior to enqueuing the time asynchronous task in the task registration storage. The accumulation management unit is configured to dequeue the time asynchronous task from the task accumulation storage and enqueue the dequeued time asynchronous task in the task registration storage.

Herein, the execution control unit, the task accumulation unit, and the accumulation management unit may be achieved by a processor executing instructions stored in a memory. For instance, the task management apparatus may be provided by including a first storage functioning as a task registration storage, a second storage functioning as a task accumulation storage, and the above processor connected with the task registration storage and the task accumulation storage.

As an optional example of the first example, during a period of time for which the time asynchronous task is executed, a subsequent time asynchronous task enqueued in the task accumulation storage may be prevented from being enqueued in the task registration storage.

According to the first example of the task management apparatus disclosed herein, the time asynchronous task immediately after its occurrence can be accumulated in a task accumulation storage different from a task registration storage, and thereafter enqueued to the task registration storage. That is, the time asynchronous task can be enqueued to the task registration storage at the point of time delayed from the time of occurrence. Suppose a case that a time synchronous task occurs while a time asynchronous task is accumulated in the task accumulation storage. In such a case, a time synchronous task that occurs after the accumulated asynchronous task can be enqueued to the task registration storage before the time asynchronous task. Therefore, the time synchronous task occurring after the time asynchronous task can be enqueued to the task registration storage before the time asynchronous task without setting the priority of the time synchronous task to be higher than the priority of the asynchronous task. Therefore, the activation delay of the time synchronous task can be suppressed without requiring interruption of the time asynchronous task under the execution.

According to a second example, a task management apparatus is provided to manage an execution order of a time synchronous task that is requested to be activated at a constant time cycle and a time asynchronous task that is requested to be activated regardless of a time cycle. The task management apparatus includes an execution control unit, an accumulation control unit, and an asynchronous task control unit. The execution control unit is configured to execute the time synchronous task and the time asynchronous task, which are enqueued in a task registration storage, in accordance with an enqueue order and task priority. The accumulation control unit is configured to enqueue and accumulate the time asynchronous task in a task accumulation storage. The asynchronous task control unit is configured to generate an execution request task and enqueue the generated execution request task in the task registration storage in response to that (i) there is no task enqueued in the task registration storage and (ii) the time asynchronous task is accumulated in the task accumulation storage (i.e., in response to that both a first condition and a second condition are satisfied, the first condition being that there is no task enqueued in the task registration storage, the second condition being that the time asynchronous task is accumulated in the task accumulation storage). The execution request task is to request an execution of the time asynchronous task in the task accumulation storage.

Herein, the execution control unit, the task accumulation unit, and the asynchronous task control unit may be achieved by a processor executing instructions stored in a memory. For instance, the task management apparatus may be provided by including a first storage functioning as a task registration storage, a second storage functioning as a task accumulation storage, and the above processor connected with the task registration storage and the task accumulation storage.

As an optional example of the second example, during a period of time for which the time asynchronous task is executed, an execution request task that requests execution of a subsequent time asynchronous task enqueued in the task accumulation storage may be prevented from being generated.

According to the second example of the task management apparatus disclosed herein, a time asynchronous task immediately after its occurrence can be accumulated in a task accumulation storage different from a task registration storage, and then dequeued from the task accumulation storage and executed. Therefore, if a time synchronous task occurs while a time asynchronous task is accumulated in the task accumulation storage, the time synchronous task that occurs after the accumulated time asynchronous task is enqueued to the task registration storage before the time asynchronous task and is executed. Therefore, the time synchronous task occurring after the time asynchronous task can be enqueued to the task registration storage before the time asynchronous task without setting the priority of the time synchronous task to be higher than the priority of the time asynchronous task. Therefore, the activation delay of the time synchronous task can be suppressed without requiring interruption of the time asynchronous task under the execution.

What is claimed is:

1. A task management apparatus that manages an execution order of a time synchronous task that is requested to be activated at a constant time cycle and a time asynchronous task that is requested to be activated regardless of a time cycle,
the task management apparatus comprising:
a first storage functioning as a task registration storage;
a second storage functioning as a task accumulation storage; and
a processor connected with the task registration storage and the task accumulation storage,
the processor being configured to:
execute the time synchronous task and the time asynchronous task, which are enqueued in the task registration storage, in accordance with an enqueue order and task priority;
enqueue and accumulate the time asynchronous task in the task accumulation storage prior to enqueuing the time asynchronous task in the task registration storage; and
dequeue the asynchronous task from the task accumulation storage and enqueue the dequeued asynchronous task in the task registration storage.

2. The task management apparatus according to claim 1, wherein
the processor is further configured to move the time asynchronous task accumulated in the task accumulation storage to the task registration storage one by one when dequeuing the time asynchronous task from the task accumulation storage to enqueue the dequeued time asynchronous task in the task registration storage.

3. The task management apparatus according to claim 1, wherein:
the processor is further configured to move a plurality of the time asynchronous tasks accumulated in the task accumulation storage to the task registration storage collectively when dequeuing the time asynchronous tasks from the task accumulation storage to enqueue the dequeued time asynchronous tasks in the task registration storage.

4. The task management apparatus according to claim 1, wherein
the processor is further configured to;
move a predetermined number of the time asynchronous tasks accumulated in the task accumulation storage to the task registration storage when dequeuing the time asynchronous tasks from the task accumulation storage to enqueue the dequeued time asynchronous tasks in the task registration storage; and
set the predetermined number variably according to conditions.

5. A task management apparatus that manages an execution order of a time synchronous task that is requested to be activated at a constant time cycle and a time asynchronous task that is requested to be activated regardless of a time cycle,
the task management apparatus comprising:
a first storage functioning as a task registration storage;
a second storage functioning as a task accumulation storage; and
a processor connected with the task registration storage and the task accumulation storage,
the processor being configured to:
execute the time synchronous task and the time asynchronous task, which are enqueued in the task registration storage, in accordance with an enqueue order and task priority;
enqueue and accumulate the time asynchronous task in the task accumulation storage; and
generate an execution request task and enqueue the generated execution request task in the task registration storage in response to that (i) there is no task enqueued in the task registration storage and (ii) the time asynchronous task is accumulated in the task accumulation storage, the execution request task requesting an execution of the time asynchronous task in the task accumulation storage.

6. The task management apparatus according to claim 5, wherein
the execution request task is a task that requests execution of one time asynchronous task accumulated in the task accumulation storage.

7. The task management apparatus according to claim 5, wherein
the execution request task is a task that requests execution of a plurality of time asynchronous tasks accumulated in the task accumulation storage.

8. The task management apparatus according to claim 5, wherein:
the execution request task is a task that requests execution of a predetermined number of the time asynchronous tasks accumulated in the task accumulation storage; and
the processor is further configured to set variably the predetermined number according to conditions.

* * * * *